United States Patent
Braswell et al.

(10) Patent No.: US 7,812,995 B2
(45) Date of Patent: Oct. 12, 2010

(54) MACHINE SETUP BY SCANNING A CONFIGURATION SHEET

(75) Inventors: Charles David Braswell, Henrietta, NY (US); David Grant Baxter, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 1088 days.

(21) Appl. No.: 11/154,601

(22) Filed: Jun. 17, 2005

(65) Prior Publication Data

US 2006/0285126 A1  Dec. 21, 2006

(51) Int. Cl.
*G06F 3/12* (2006.01)

(52) U.S. Cl. .................. 358/1.18; 358/1.1; 358/1.9; 358/400; 715/863; 709/203; 709/220

(58) Field of Classification Search ............. 358/1.15, 358/1.1, 1.18, 1.9, 1.6, 1.13, 400; 715/863; 399/84; 709/220, 203, 221, 226
See application file for complete search history.

(56) References Cited

U.S. PATENT DOCUMENTS

| | | | | |
|---|---|---|---|---|
| 4,757,348 A | * | 7/1988 | Rourke et al. ............. | 399/84 |
| 4,811,243 A | * | 3/1989 | Racine ...................... | 715/863 |
| 6,222,638 B1 | * | 4/2001 | Otala ........................ | 358/1.18 |
| 6,563,598 B1 | * | 5/2003 | Johnson et al. ............ | 358/1.15 |
| 7,054,924 B1 | * | 5/2006 | Harvey et al. ............. | 709/220 |

FOREIGN PATENT DOCUMENTS

GB  2355358 A  4/2001

\* cited by examiner

*Primary Examiner*—Twyler L Haskins
*Assistant Examiner*—Ashish K Thomas
(74) *Attorney, Agent, or Firm*—Ronald E. Prass, Jr.; Prass LLP

(57) ABSTRACT

A method, system, and computer program for configuring a device provides the capability for a user to easily enter complex configuration settings by scanning sheets or documents having information defining the configuration settings into the device. A method for configuring a device comprises imaging a document, extracting configuration data from the imaged document, and setting configuration parameters of the device using the extracted configuration data.

17 Claims, 5 Drawing Sheets

MACHINE SETUP BY SCANNING A CONFIGURATION SHEET

TECHNICAL FIELD

The present technology relates to a method, system, and computer program for configuring a device by scanning sheets or documents having information defining the configuration settings into the device.

BACKGROUND OF THE TECHNOLOGY

As electronic and electromechanical devices have grown more complex, configuration of such devices has also grown more complex. Common types of devices include scanners, fax machines, copiers, and multi-function devices. A user may operate the device in order to perform tasks or jobs. Typically, the device must be configured to perform a particular task. While many common or simple task can be performed with default or simply-entered configuration settings, many other tasks require more complex configuration, Typically, a user configures a device using a user interface, such as a keypad and display. While such a user interface may be adequate for entry of simple configuration settings, it can be quite difficult to enter complex configuration settings that way.

A need arises for a technique by which configuration settings may be entered into a device that provides the capability for a user to easily enter complex configuration settings by scanning sheets or documents having information defining the configuration settings into the device.

SUMMARY OF THE TECHNOLOGY

A method, system, and computer program for configuring a device provides the capability for a user to easily enter complex configuration settings by scanning sheets or documents having information defining the configuration settings into the device.

A method for configuring a device comprises imaging a document, extracting configuration data from the imaged document, and setting configuration parameters of the device using the extracted configuration data. The device may be a photocopier, a xerographic photocopier, a scanner, a printer, a xerographic printer, a fax machine, a xerographic fax machine, a multi-function device, or a xerographic multi-function device. The document may be imaged using a scanner component of the device. The document may comprise a plurality of sheets. The configuration parameters of the device that are set may include at least one of network configuration settings, time out settings, file server destinations, fax telephone numbers, predefined job selection, predefined job definition, account setup information, and usage information of the device. The configuration data on the document may be encoded using at least one of a one-dimensional barcode, a two-dimensional barcode, text, and spatial indicia.

BRIEF DESCRIPTION OF THE DRAWINGS

Objects and advantages of the technology described in the present disclosure will be more clearly understood when considered in conjunction with the accompanying drawings, in which.

DETAILED DESCRIPTION

The present technology provides the capability for a user to easily enter complex configuration settings by scanning sheets or documents having information defining the configuration settings into the device.

Figure 1:
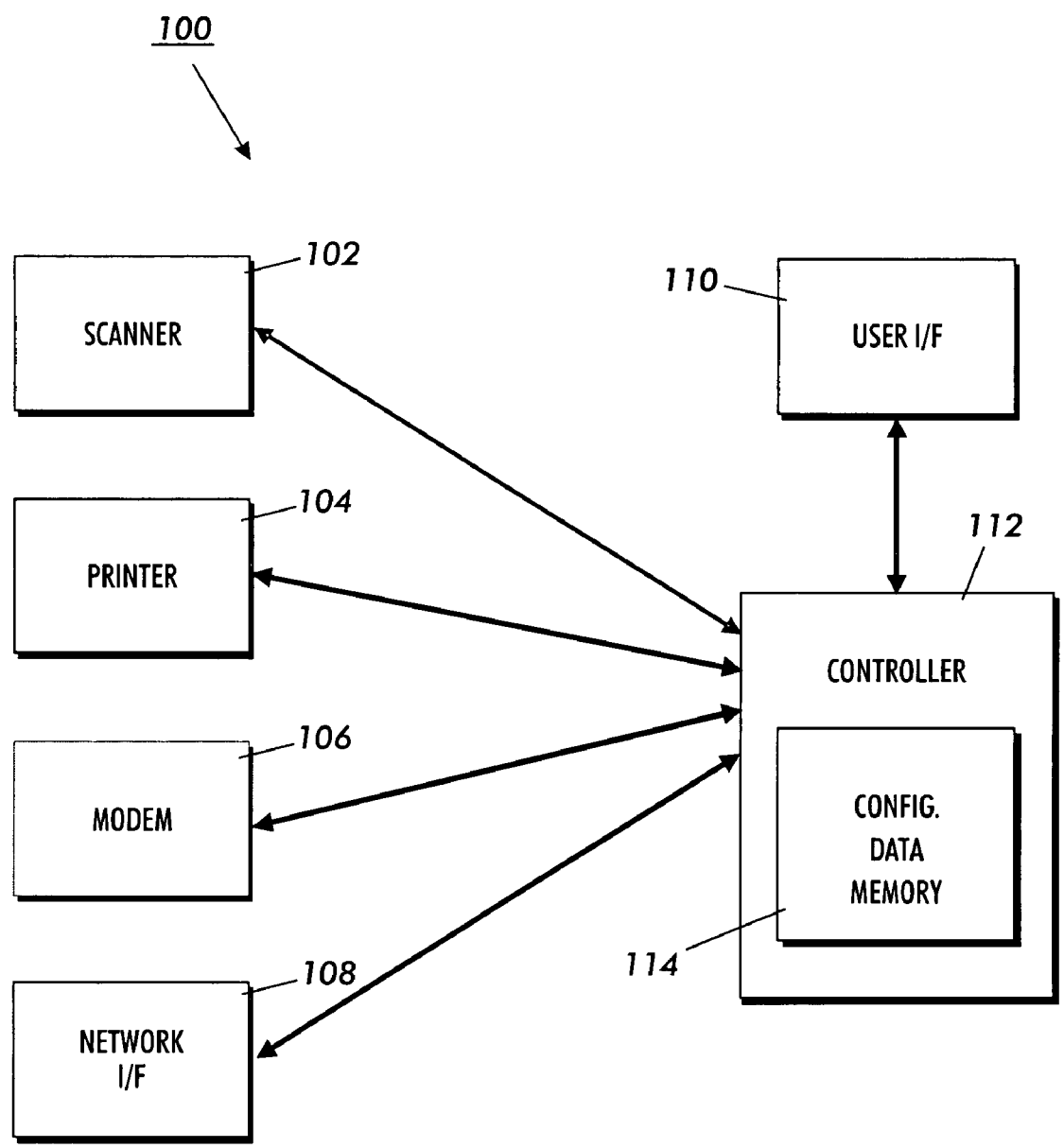
FIG. 1 is an exemplary diagram of a system to which the technology described in the present disclosure may be advantageously applied.

An example of a device 100, to which the present technology may be advantageously applied, is shown in FIG. 1. In the example shown in FIG. 1 a device 100 may include a number of components, such as scanner 102, printer 104, modem 106, network interface 108, user interface 110, etc. Typically, these components are controlled by at least one controller 112, which controls the operation of each component in order to perform the functions of device 100. Controller 112 also stores configuration parameter settings in configuration data memory 114. Scanner 102 may be used to scan in images of documents, drawings, photographs, etc., printer 104 may be used to generate documents, drawings, photographs, etc., modem 106 may be used to transmit and/or receive data such as fax data, data representing documents, drawings, photographs, etc., over telephone lines, and network interface 108 may be used to transmit and/or receive data such as fax data, data representing documents, drawings, photographs, etc., over a data communication network. In addition to individual function performed by each component, device 100 may use more than one component in order to perform a device wide function. For example, device 100 may use scanner 102 and modem 106 in order to transmit a fax, modem 106, and printer 104 in order to receive a fax, scanner 102, and printer 104 in order to copy a document, scanner 102, and network interface 108 in order to scan a document, etc.

In order to perform these functions, each component and/or device must be configured based on the desired functions. Configuration does not involve the control of a component or device during operation of the component or device. Rather, configuration involves setting up a component or device with information needed to perform a function, parameters that defined characteristics of the function, etc., that are needed before the component or device can perform a particular function or set of functions. In order to configure a component or a device, the information needed to perform at least some of the functions must be provided based on the desired functions. Likewise, the parameters that define the characteristics of at least some of the functions that the component or device is to perform must be set to appropriate values based on the desired functions. For example, scanner 102 requires configuration of parameters such as scan resolution (dots per inch), scan depth (bits per dot), format of scanned data, etc. Printer 104 requires configuration of parameters such as print resolution (dots per inch), print depth (bits per dot), format of print data, etc. Modem 106 requires configuration of parameters such as data rate, data format, data transfer protocol, etc. Network interface 108 requires configuration of parameters such as data rate, data format, data transfer protocol, etc. In addition, device 100 requires configuration for device wide functions. For example, in order to transmit a fax, both scanner 102 and modem 106 must be configured, and data, such as the telephone numbers to which the fax is to be sent, must be configured. In order to copy a document, data, such as the copy resolution, the document size, and the number of copies, must be configured.

One way of entering the required configuration information is using user interface 110. Typically, the user enters configuration parameters using a keypad and observes the settings on a display. While this technique may be adequate for simple configuration settings, the present technology provides improvement over this. In the present technology, the user may enter configuration setting of arbitrary complexity simply and easily by scanning in one or more configuration documents into device 100. The configuration setting data represented on the configuration documents is extracted and the configuration setting data is stored in configuration data memory 114.

It is to be noted that device 100, shown in FIG. 1, is merely an example of a system to which the present technology may be advantageously applied. The present technology is not limited to this system and in fact, contemplates application to and implementation in any type of system in which documents may be scanned and processed. Additional non-limiting examples of systems to which the present technology may be applied include xerographic or other photocopiers, which may include paper handlers, document finishers, etc., scanners, printers, fax machines, etc.

Figure 2:
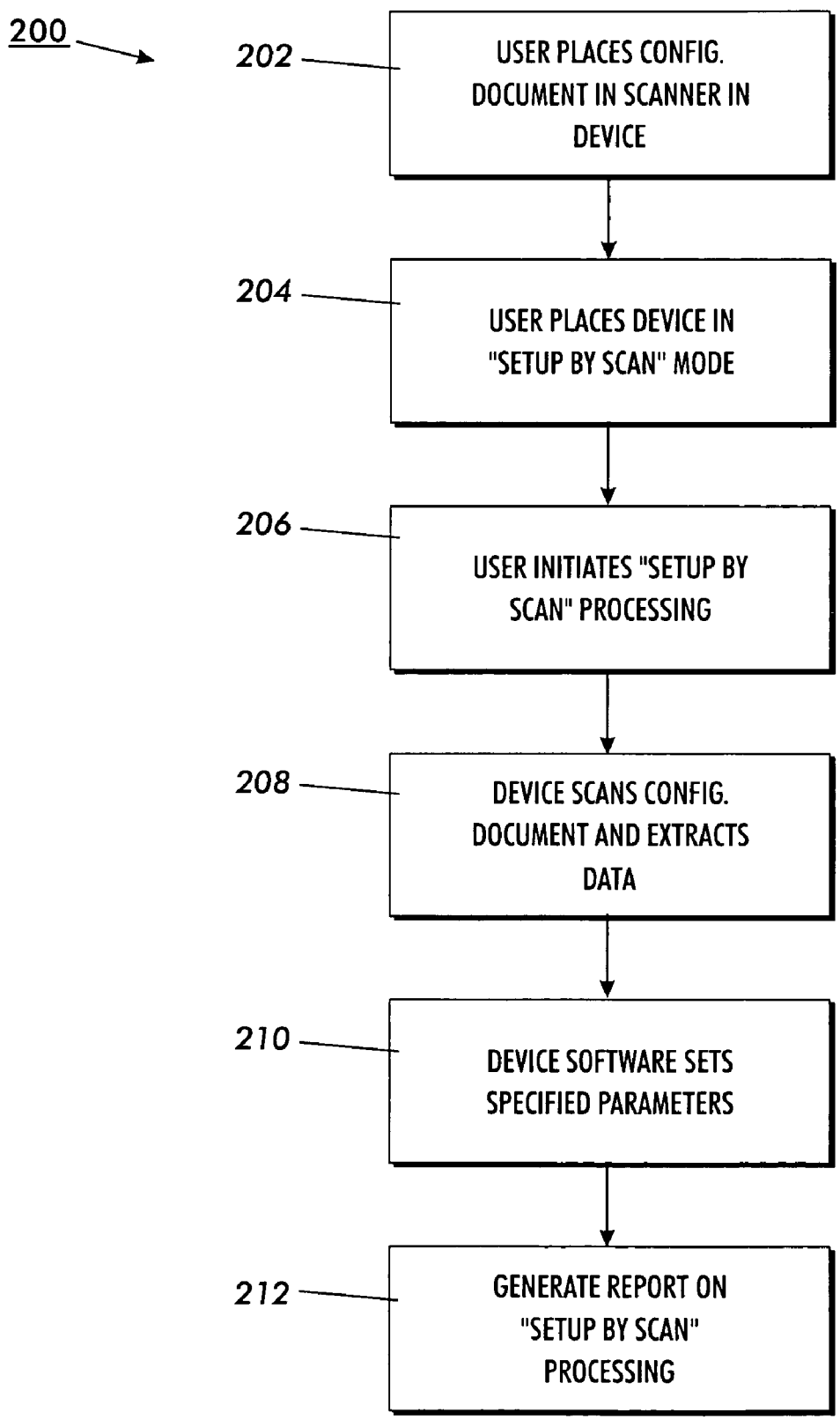
FIG. 2 is an exemplary flow diagram of a process of configuration of a device by scanning a document.

An exemplary flow diagram of a process 200 of configuration of a device by scanning a document is shown in FIG. 2. Process 200 begins with step 202, in which a user places a configuration document in a scanner component of the device to be configured. Typically, the user may place the configuration document in a document feeder or on a document glass of the scanner component. The scanner component may be a stand-alone scanner, a scanner portion of a fax machine, copier, multi-function device, etc., or any other arrangement of a component that is capable of imaging a document. The configuration document may be a single sheet, or the configuration document may be multiple sheets.

In step 204, the user places the device in "setup by scan" mode. Typically, this is done by pressing a button, such as a separate button on the device to be configured or on a component of, or connected to, the device to be configured, or by operating a user interface to place the device in the correct mode. However, any arrangement by which the user may place the device to be configured into the "setup by scan" mode is contemplated.

In step 206, the user initiates the "setup by scan" processing. Typically, this is done by pressing a button, such as a separate button on the device to be configured or on a component of, or connected to, the device to be configured, or by operating a user interface to initiate the processing. However, any arrangement by which the user may initiate the "setup by scan" processing is contemplated. For example, the device may require confirmation and/or entry of a password before the settings may be changed. Password protection may be used to restrict the ability to change certain settings of the device, such as administrator settings for the device or settings for certain subsystems. For example, a configuration document may include settings for multiple subsystems of the device when only a subset of the settings are needed, or a configuration document may include a mix of ordinary user and administrator settings. In such cases, password protection would provide a way to prevent unauthorized configuration changes.

Figure 3:
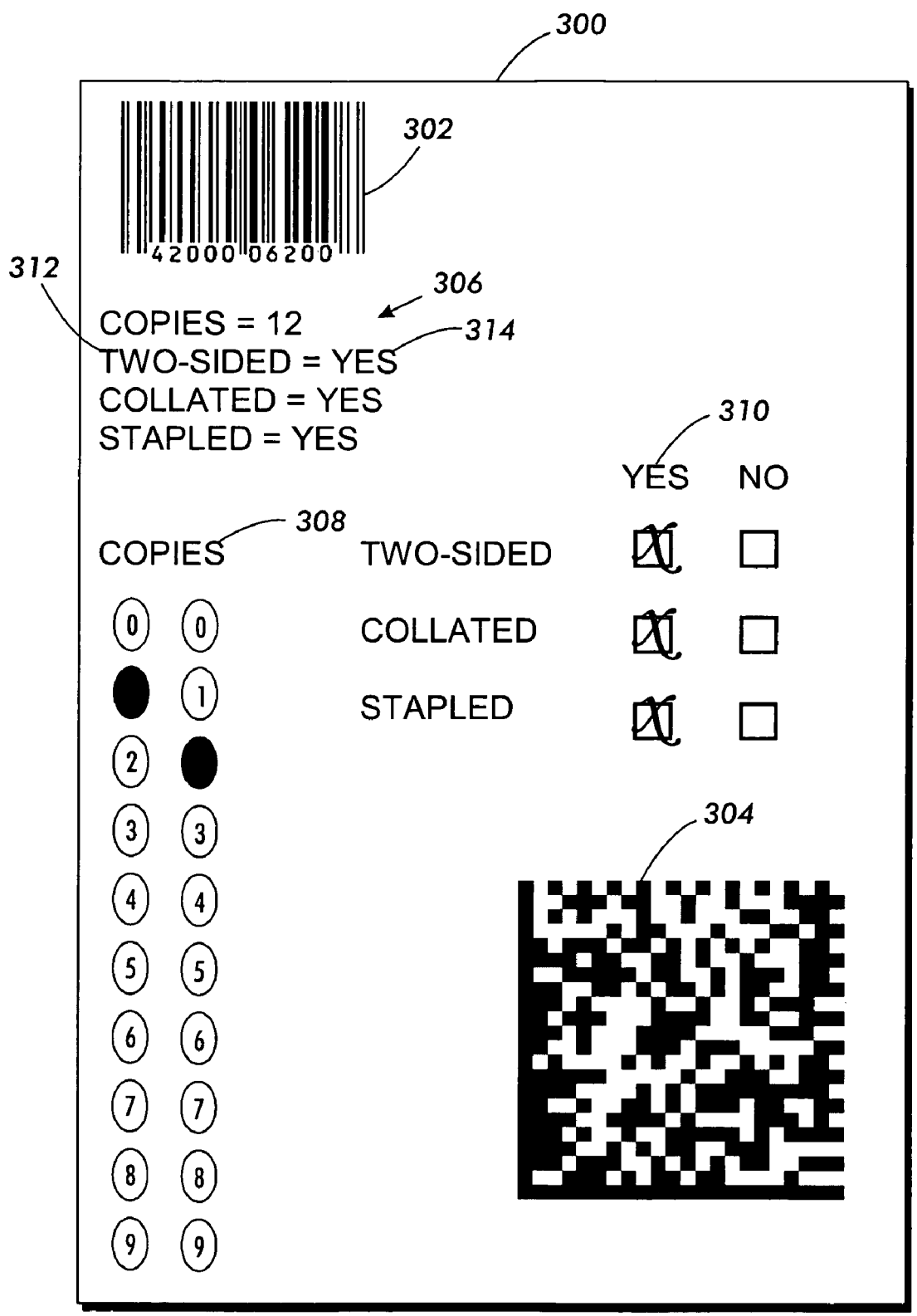
FIG. 3 is an exemplary illustration of encoding of configuration data on a configuration document.

In step 208, the device to be configured scans the configuration document and extracts configuration data. This may be done in a number of ways, depending upon the technique used to encode the configuration data onto the configuration document. Turning briefly to FIG. 3, examples of encoding of configuration data on a configuration document 300 are shown. For example, the configuration data may be encoded on the configuration document as one-dimensional barcode information 302 or two-dimensional barcode (glyph) information 304 and the configuration data may be extracted by a barcode recognition process. The configuration data may be encoded on the configuration document as text information 306 and the configuration data may be extracted by an optical character recognition process. The configuration data may be encoded on the configuration document as spatial indicia encoded information, such as fill-in bubbles 308 or check boxes 310 and the configuration data may be extracted by spatial data extraction process. Typically, configuration data is encoded on the configuration document in data pair including a parameter identifier (ID) and a value to which the identified parameter is to be set. For example, text information 306 includes a number of parameters to be set, each including a parameter ID, such as parameter ID 312, and a parameter value, such as parameter value 314. The extracted parameter ID is used to identify the parameter to be set and the extracted parameter value is used to set the identified parameter. These are merely examples of encoding/decoding techniques that may be used. Any technique by which data may be encoded onto a document and any corresponding technique by which the encoded data may be extracted from the document is contemplated.

Figure 4:
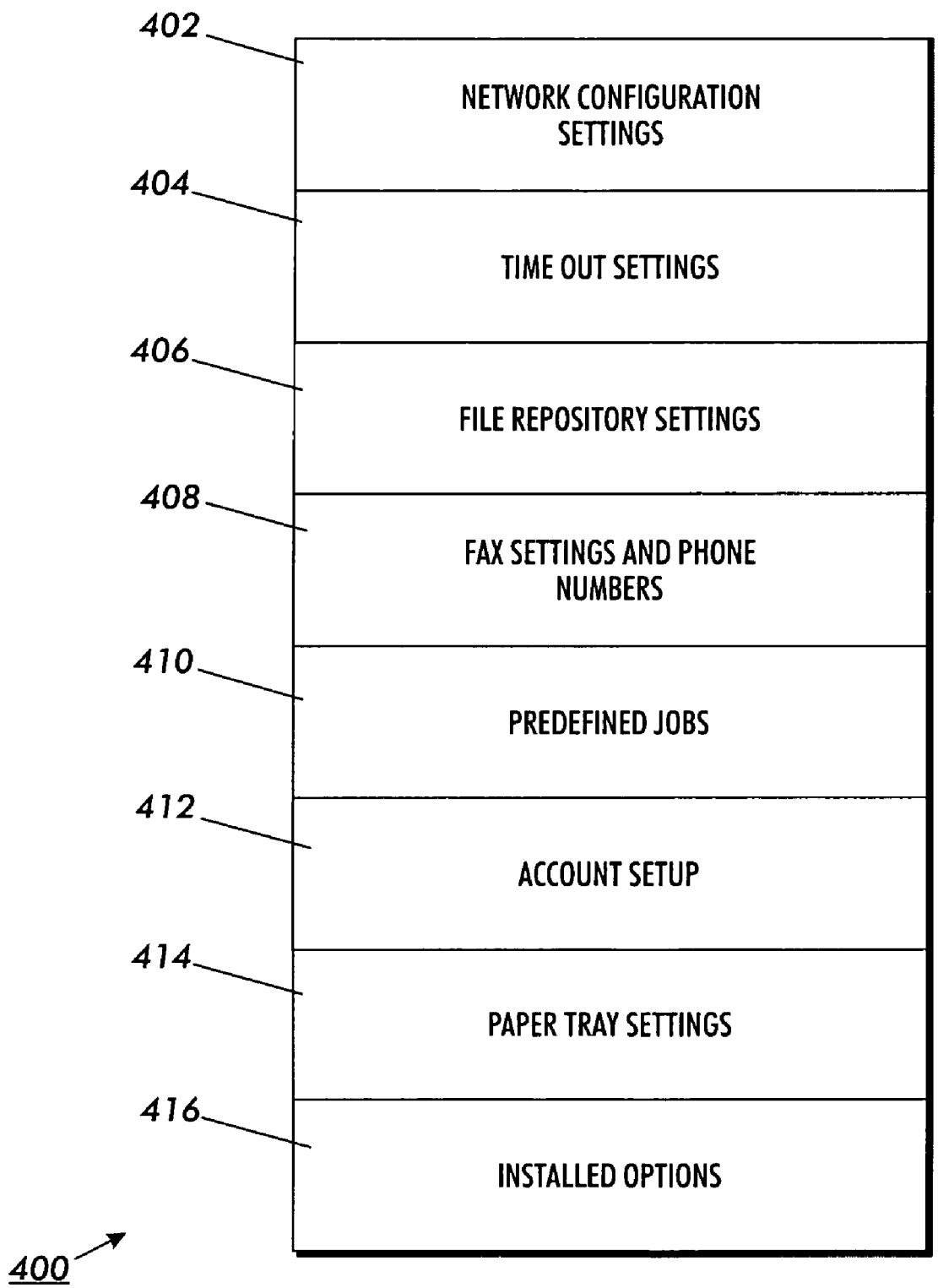
FIG. 4 is an exemplary format of a data structure that may store configuration data.

Returning to FIG. 2, in step 210, the extracted data is used to set configuration parameters in the device to be configured. Typically, the configuration parameters are stored in one or more data structures in configuration memory 114, shown in FIG. 1, or elsewhere in the device to be configured. Turning briefly to FIG. 4, an example of such a data structure 400 is shown. In the example shown in FIG. 4, data structure 400 includes storage for network configuration settings 402, time out settings, 404, file repository settings 406, fax settings and phone numbers 408, predefined jobs 410, account setup 412, paper tray settings 414, installed options 416, etc. Network configuration settings 402 may include parameters such as IP address, protocol enable, Host Name, Subnet Mask, Default Gateway, DNS Server, Alternate DNS servers, Raw TCP/IP address, Novel Networking Settings, AppleTalk Enablement, AppleTalk Device Name, Microsoft Networking Enablement, MS Networking SMB Host Name, HTTP Enablement, HTTP Port Number, Email SMTP, LDAP and POP3 settings to support features such as scan to Email when present, USB port settings, etc. Time out settings 404 may include parameters such as inactivity timeouts, lack of response timeouts, time until job being setup reverts to default job if setting have not changed, wait time after Nth unsuccessful login, Power Saver activation time, morning power up schedule, etc. File repository settings 406 may include parameters to support Scan to File Features such as protocols allowed, server names, directory paths, Login names, etc. Fax settings and phone numbers 408 may include parameters such as Fax phone line selection, recipient Fax number list, etc. Predefined jobs 410 may include parameters such as job settings for a number of predefined jobs that can be recalled with a menu or hot key process, such as copy, fax, scan to file, and other jobs. Account setup 412 may include parameters such what accounting method(s) are enabled, who can be an administrator, how many accounts are provided, initial account setups items such as maximum impressions allowed, job types permitted, usage information of the device, etc. Paper tray settings 414 may include parameters such as Media Size, Media Color, Media Orientation, Media Type, etc.

Installed options 416 may include parameters such as what options are installed, what options are enabled, etc.

These are merely examples of types of parameters that may be configured. The setting of any parameters that may be relevant to any function or task to be performed by the device to be configured is contemplated.

In step 212, a report on the "setup by scan" processing is generated. The report may indicate success or failure of the configuration process, conflicts or errors in the configuration parameters, sets, subsets, or all of the parameters that were configured or that are in the device, etc.

Configuration data can be used not only to set values of operational parameters of the device, but to control the functions and operation of the device itself. For example, the configuration data encoded on the document may represent a script to request a sequence of device operations, such as device diagnostics, sequences of job operations, configuration to return the device to a known state, such as "dust-off", in which the device is made ready for delivery to a new user, etc. In addition, a self-filling form may be used as the scanned document. In this case, the scanned document is a form that contains parameter ID without values. The device may extract the parameter IDs from the scanned document and fill in the currently set values, or other appropriate values, into the form. The form may then be output by printing it, faxing it, emailing it, etc.

The configuration documents may be created in a number of ways. For example, configuration documents may be created interactively by a dedicated computer program. Such a program would typically provide a user interface with which a user could select configuration parameters, scripts, etc., and would then output the scannable configuration documents, typically by printing them. Likewise, a configuration document may be created using a general purpose program, such as a text editor. In this case, the output may be text, which is useful with devices that include optical character recognition capabilities. As another example, a configuration document may be generated by a device to memorialize its current configuration settings. This configuration document may then be used to configure the same device at a later time or to configure another device.

Figure 5:
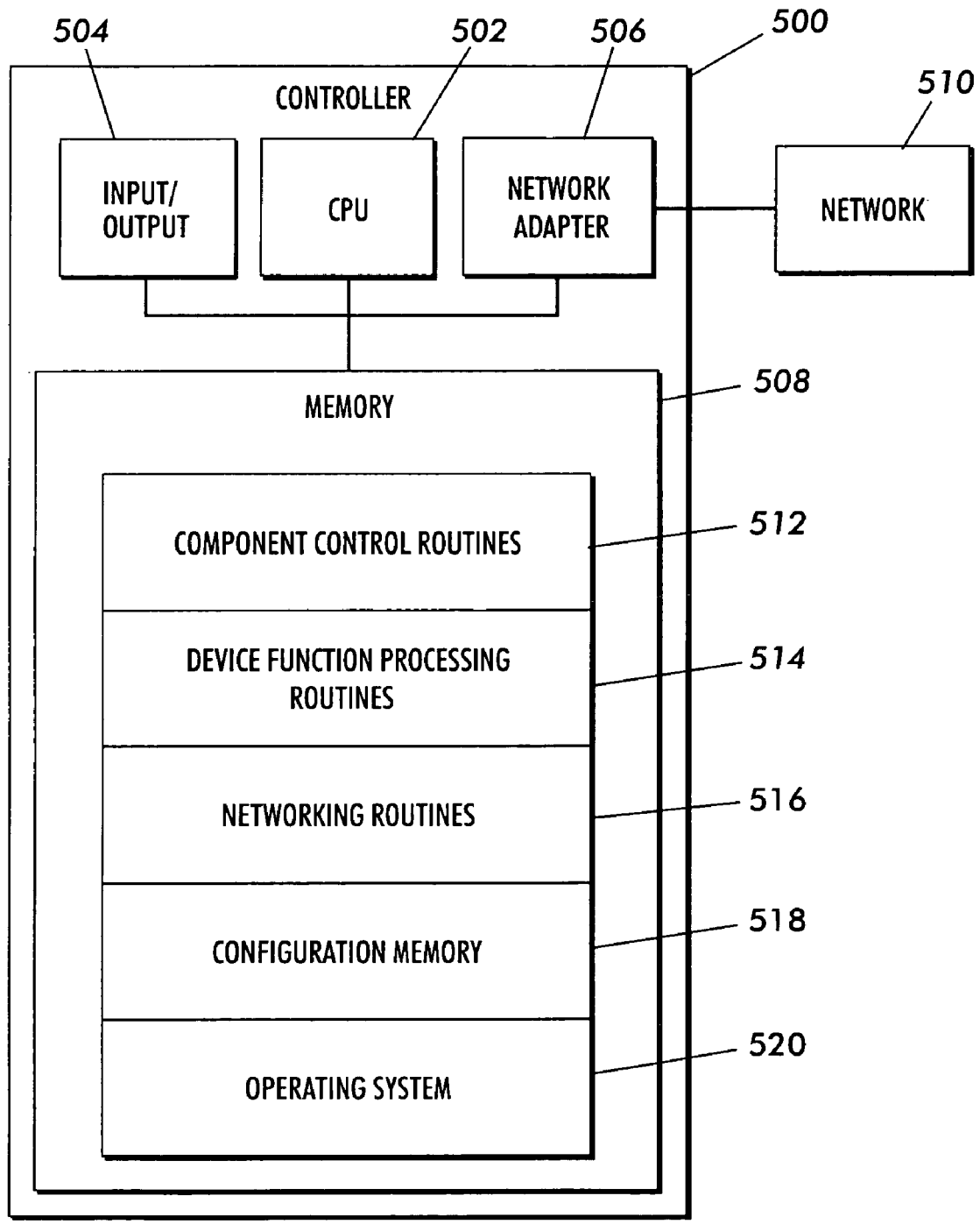
FIG. 5 is an exemplary block diagram of a device in which the technology described in the present disclosure may be implemented.

A block diagram of an exemplary controller 500, which may control the functionality of a device, such as device 100 shown in FIG. 1, is shown in FIG. 5. Controller 500 is typically a microcontroller or single-chip computer system, but may be a programmed general-purpose computer system, such as a personal computer, workstation, server system, and minicomputer or mainframe computer. Controller 500 includes processor (CPU) 502, input/output circuitry 504, network adapter 506, and memory 508. CPU 502 executes program instructions in order to carry out the functions of the present technology. Although in the example shown in FIG. 5, controller 500 is a single processor computer system, the present technology contemplates implementation on a system or systems that provide multi-processor, multi-tasking, multi-process, multi-thread computing, distributed computing, and/or networked computing, as well as implementation on systems that provide only single processor, single thread computing. Likewise, the present technology also contemplates embodiments that utilize a distributed implementation, in which controller 500 is implemented on a plurality of networked computer systems or microcontrollers, which may be single-processor computer systems, multi-processor computer systems, or a mix thereof.

Input/output circuitry 504 provides the capability to input data to, or output data from, controller 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces controller 500 with network 510. Network 510 may be any standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of the present technology. Memory 508 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA) or SATA (Serial ATA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 508 includes component control routines 512, device function processing routines 514, networking routines 516, configuration memory 518, and operating system 520. Component control routines 512 provide the capability for controller 500 to control the operation of individual components of the device, such as the device 100 and components shown in FIG. 1. Device function processing routines 514 provide the capability for controller 500 to control the operation of the overall device 100, in addition to the individual components. Networking routines 516 provide the capability for controller 500 to communicate with other controllers that may be included in device 100 and in the individual components, as well at the capability for device 100 to communicate with other devices. Configuration memory 518 provides storage for configuration data and parameters that control the operation and functionality of device 100. Operating system 512 provides overall system functionality.

Although specific embodiments of the present technology have been described, it will be understood by those of skill in the art that there are other embodiments that are equivalent to the described embodiments. Accordingly, it is to be understood that the technology is not to be limited by the specific illustrated embodiments, but only by the scope of the appended claims.

The invention claimed is:

1. A method for configuring a device, comprising:
   imaging a document using a scanner of the device;
   extracting configuration parameters from the imaged document using a controller of the device;
   setting configuration parameters of the device using the extracted configuration parameters using the controller of the device, wherein the extracted configuration parameters represents a script to request a sequence of device operations to set-up the device to a known state for operation by a user and includes network configuration settings, time out settings, file server destinations, fax telephone numbers, predefined job selection, predefined job definition, account setup information, usage information, paper tray settings, and installed options of the device; and
   generating a report that indicates a success or a failure of the setting of configuration parameters using the controller of the device.

2. The method of claim 1, wherein the device is photocopier, a xerographic photocopier, a scanner, a printer, a xerographic printer, a fax machine, a xerographic fax machine, a multi-function device, or a xerographic multi-function device.

3. The method of claim 1, wherein the document comprises a single sheet.

4. The method of claim 1, wherein the document comprises a plurality of sheets.

5. The method of claim 1, wherein the configuration data on the document is encoded using at least one of a one-dimensional barcode, a two-dimensional barcode, text, and spatial indicia.

6. A device comprising:
   an imaging apparatus operable to image a document;
   an apparatus operable to extract configuration parameters from the imaged document;
   an apparatus operable to set configuration parameters of the device using the extracted configuration parameters, wherein the extracted configuration parameters represents a script to request a sequence of device operations to set-up the machine to a known state for operation by a user and include network configuration settings, time out settings, file server destinations, fax telephone numbers, predefined job selection, predefined job definition, account setup information, usage information, paper tray settings, and installed options of the device; and
   an apparatus operable to generate a report that indicates a success or a failure of the setting of configuration parameters.

7. The device of claim 6, wherein the device is photocopier, a xerographic photocopier, a scanner, a printer, a xerographic printer, a fax machine, a xerographic fax machine, a multi-function device, or a xerographic multi-function device.

8. The device of claim 7, wherein the imaging apparatus comprises a scanner.

9. The device of claim 6, wherein the document comprises a single sheet.

10. The device of claim 6, wherein the document comprises a plurality of sheets.

11. The device of claim 6, wherein the configuration data on the document is encoded using at least one of a one-dimensional barcode, a two-dimensional barcode, text, and spatial indicia.

12. A computer readable medium storing a computer program for configuring a device comprising:
   a computer readable medium;
   computer program instructions, recorded on the computer readable medium, executable by a processor, for performing the steps of:
   imaging a document;
   extracting configuration parameters from the imaged document;
   setting configuration parameters of the device using the extracted configuration parameters, wherein the extracted configuration parameters represents a script to request a sequence of device operations to set-up the machine to a known state for operation by a user and include network configuration settings, time out settings, file server destinations, fax telephone numbers, predefined job selection, predefined job definition, account setup information, usage information, paper tray settings, and installed options of the device; and
   generating a report that indicates a success or a failure of the setting of configuration parameters.

13. The computer readable medium of claim 12, wherein the device is a photocopier, a xerographic photocopier, a scanner, a printer, a xerographic printer, a fax machine, a xerographic fax machine, a multi-function device, or a xerographic multi-function device.

14. The computer readable medium of claim 13, wherein the document is imaged using a scanner component of the device.

15. The computer readable medium of claim 12, wherein the document comprises a single sheet.

16. The computer readable medium of claim 12, wherein the document comprises a plurality of sheets.

17. The computer readable medium of claim 12, wherein the configuration data on the document is encoded using at least one of a one-dimensional barcode, a two-dimensional barcode, text, and spatial indicia.

* * * * *